United States Patent
Tanaka

[19]
[11] Patent Number: 6,024,437
[45] Date of Patent: Feb. 15, 2000

[54] METHOD AND APPARATUS FOR RECORDING COLOR IMAGES IN BOTH INTERLACED AND NON-INTERLACED MODES

[75] Inventor: Fumihiro Tanaka, Yono, Japan

[73] Assignee: Canon Kabushiki Kaisha, Tokyo, Japan

[21] Appl. No.: 08/364,018

[22] Filed: Dec. 27, 1994

Related U.S. Application Data

[63] Continuation of application No. 07/888,834, May 27, 1992, abandoned.

[30] Foreign Application Priority Data

Jul. 9, 1991 [JP] Japan ................................ 3-168321

[51] Int. Cl.[7] .................................................. B41J 2/21
[52] U.S. Cl. .................................................... 347/43
[58] Field of Search ............................ 347/40, 41, 43; 358/298, 502

[56] References Cited

U.S. PATENT DOCUMENTS

| | | | |
|---|---|---|---|
| 4,533,928 | 8/1985 | Sugiura et al. | 347/43 X |
| 4,622,582 | 11/1986 | Yamada | 358/80 |
| 4,679,074 | 7/1987 | Sugiura et al. | 358/80 |
| 4,728,968 | 3/1988 | Hillmann et al. | 347/41 |
| 4,748,453 | 5/1988 | Lin et al. | 347/41 |
| 4,772,911 | 9/1988 | Sasaki et al. | 358/298 X |
| 4,805,013 | 2/1989 | Dei et al. | 358/80 |
| 4,853,768 | 8/1989 | Suzuki et al. | 358/80 |
| 4,888,636 | 12/1989 | Abe | 358/80 |
| 4,965,593 | 10/1990 | Hickman | 347/41 |
| 4,970,584 | 11/1990 | Sato et al. | 358/75 |
| 4,999,646 | 3/1991 | Trask | 347/41 |
| 5,182,637 | 1/1993 | Yoshioka et al. | 358/75 |

FOREIGN PATENT DOCUMENTS

| | | | |
|---|---|---|---|
| 3409771 | 9/1984 | Germany. | |
| 146345 | 6/1991 | Japan | 347/43 |

*Primary Examiner*—N. Le
*Assistant Examiner*—L. Anderson
*Attorney, Agent, or Firm*—Fitzpatrick, Cella, Harper & Scinto

[57] ABSTRACT

An image recording apparatus having plural recording methods and permitting selection of a recording method in accordance with a desired level of record results during recording of image data to produce a difference in color between the record results due to changes in the recording methods when an image to be recorded is color data. The invention includes plural color conversion means corresponding to a plurality of recording methods so as to perform color conversion suitable for the selected recording method in order to prevent differences in the color of the record results from occurring.

25 Claims, 7 Drawing Sheets

ONE SCAN BY RECORDING HEAD

FIG. 7
PRIOR ART

ONE SCAN BY RECORDING HEAD

ONE SCAN BY RECORDING HEAD

FIG. 8

METHOD AND APPARATUS FOR RECORDING COLOR IMAGES IN BOTH INTERLACED AND NON-INTERLACED MODES

This application is a continuation of application Ser. No. 07/888,834 filed May 27, 1992, now abandoned.

BACKGROUND OF THE INVENTION

1. Field of the Invention

The present invention relates to a method and apparatus for recording color images, and particularly to a method and apparatus for recording color images in which color information in the input data on color image formation is converted into color information for image recording on the basis of the input data on color image formation to form and record an image pattern.

2. Description of Related Art

Conventional methods and apparatuses for recording color images typically have a single predetermined method and apparatus for recording images and only one means for converting color image formation data into color information for image recording in accordance with the image recording means.

Figure 6:
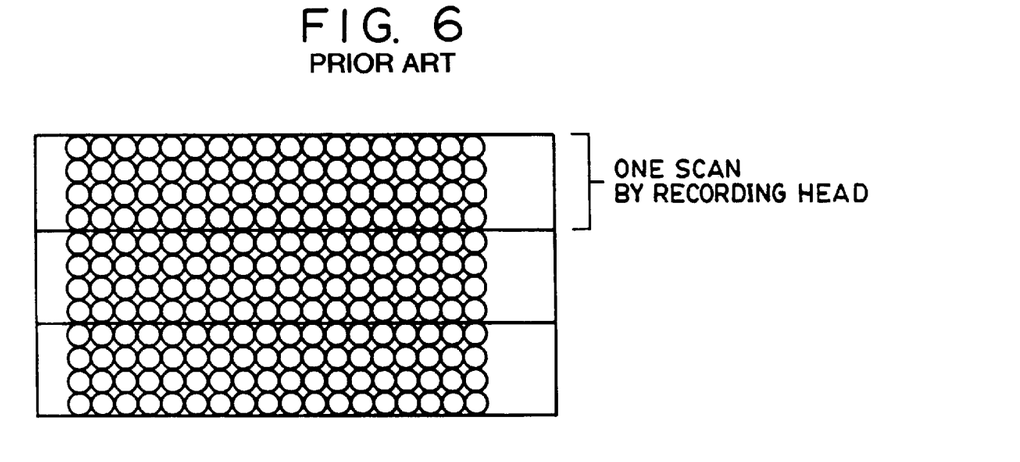
FIG. 6 is an explanatory view showing a first image recording method.
Figure 7:
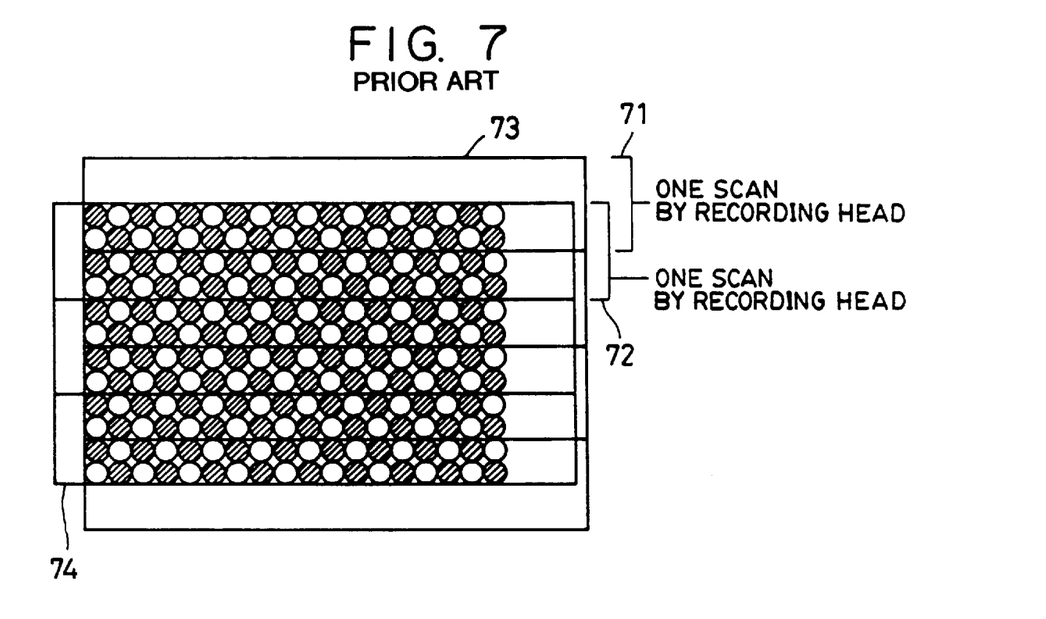
FIG. 7 is an explanatory view showing a second image recording method.

High-quality image recording apparatuses include image recording apparatuses each of which is provided with plural different image recording means as image recording means, as shown in FIGS. 6 and 7.

FIGS. 6 and 7 shows, respectively, recording methods in which an image is recorded by using a recording head which is capable of recording 4 dots at a time in the longitudinal direction and 1 dot in the lateral direction.

In the recording method shown in FIG. 6, the recording head is moved horizontally so as to successively record image portions each having 4 dots in the longitudinal direction and 1 dot in the lateral direction, and the head or recording paper is then moved so that the head is moved longitudinally by 4 dots with a positional relation between the head and the recording paper. The head is again moved horizontally so as to successively record image portions each having 4 dots in the longitudinal direction.

On the other hand, in the recording method shown in FIG. 7, the recording head is moved horizontally so as to record every other dot in both the longitudinal and lateral directions, e.g., record the black dots only shown in FIG. 7 when the head is placed at a scan position 71, and the head (or paper) is then longitudinally moved by the length of half of the longitudinal length of the head, i.e., for a length corresponding to 2 dots, so as to record the remaining dots, i.e., record the white dots only as shown in FIG. 7 when the head is placed at scan position 72. When this process is repeated, the whole image is recorded. Namely, black dots are recorded at scan position 73, and white dots are recorded at scan position 74, thereby recording an image in the same way as the recording method shown in FIG. 6.

Thus, it is known that interlaced recording, as shown in FIG. 7 will produce a higher quality recording than non-interlaced (normal) recording, as depicted in FIG. 6.

A comparison of the above two recording methods shows that the method shown in FIG. 6 has the fault that the dots recorded are superimposed or separated due to irregularities in the longitudinal movement of the paper or the recording head during each horizontal scan of the recording head, thereby sometimes producing a remarkable lateral-striped pattern.

An advantage of the method shown in FIG. 7 is that the remarkable lateral-striped pattern produced in the scanning direction of the recording head, i.e., the horizontal direction, by the method shown in FIG. 6 is not so pronounced, although the method has the fault that the scan time of the recording head is doubled, increasing the recording time.

An apparatus for recording color images which is provided with two means for respectively realizing both recording methods so that one of the recording means can be selected according to the desired printing state, and the required level of the result of printing is thus selected.

However, the above two methods produce different recording results even when the same color data is used.

The difference in the recording results, which is caused by a difference in the methods, is due to the following:

Printing all dots at one time causes mixing of adjacent dots. In contrast, recording every other dot during one scan using a recording head to record adjacent dots with a time deviation corresponding to one scan prevents adjacent dots from being affected by each other because the adjacent dots are recorded after the first recorded dot is stabilized by drying, fixing and the like.

However, a conventional apparatus which is capable of recording using plural recording methods has only one color conversion means for converting a color component in the color image formation input data into color information for image recording and thus uses the same color conversion means for recording an image for whichever recording means is used. This causes the color of the record result to be changed in accordance with the particular recording method selected.

SUMMARY OF THE INVENTION

It is an object of the present invention to provide a method and apparatus for recording color images which is capable of recording a desired color regardless of whichever of several recording methods is used for recording a color image, and prevents the color from being changed in accordance with the recording method used.

In order to achieve this object, color conversion means respectively corresponding to executable image recording methods are prepared to obtain the same record result for whichever recording method is selected and executed.

In accordance with one aspect of the present invention, there is disclosed a color image recording method comprising the steps of inputting color information to be subsequently output, indicating a method of recording image information which is to be performed, this method being selected from plural methods of recording image information, and converting the color information to be subsequently output according to the recording method which has been indicated, and outputting an image information which has been determined according to the color information obtained in the converting step. In some cases, the plural methods of recording have different orders of recording the image information to be output.

According to another aspect of the present invention there is disclosed a color image recording method comprising the steps of converting first color information in an input image information into second color information for recording based on the input image information. Further steps include recording converted information, providing plural methods of recording the color image, providing plural methods of converting the first color information in correspondence with the plural methods, and selecting one of the plural recording methods so that the color conversion methods are switched.

Yet an additional aspect of the invention is a color image recording apparatus having color information input means for inputting color information to be subsequently output, record method indicating means for indicating a method of recording image information, this method being selected from plural methods of recording image information, color conversion means for converting the color information to be subsequently output in accordance with the recording method indicated by the record method indicating means, and image output means for outputting the image information in accordance with the color information obtained by color conversion using the color information conversion means.

Still an additional aspect of out invention relates to a color image recording apparatus in which first color information in color image data is converted into second color information for recording an image based on the color image data to form plural image patterns which are respectively recorded by plural different image recording methods. This apparatus has plural color conversion means for converting the first color information in the color image data into the second color information in accordance with the plural recording methods, and conversion control means for converting, these conversion control means receiving a control signal for selecting one of the plural recording methods so as to control the color conversion means in accordance with the control signal.

DESCRIPTION OF THE PREFERRED EMBODIMENTS

An embodiment of the present invention is described in detail below with reference to the attached drawings.

Figure 1:
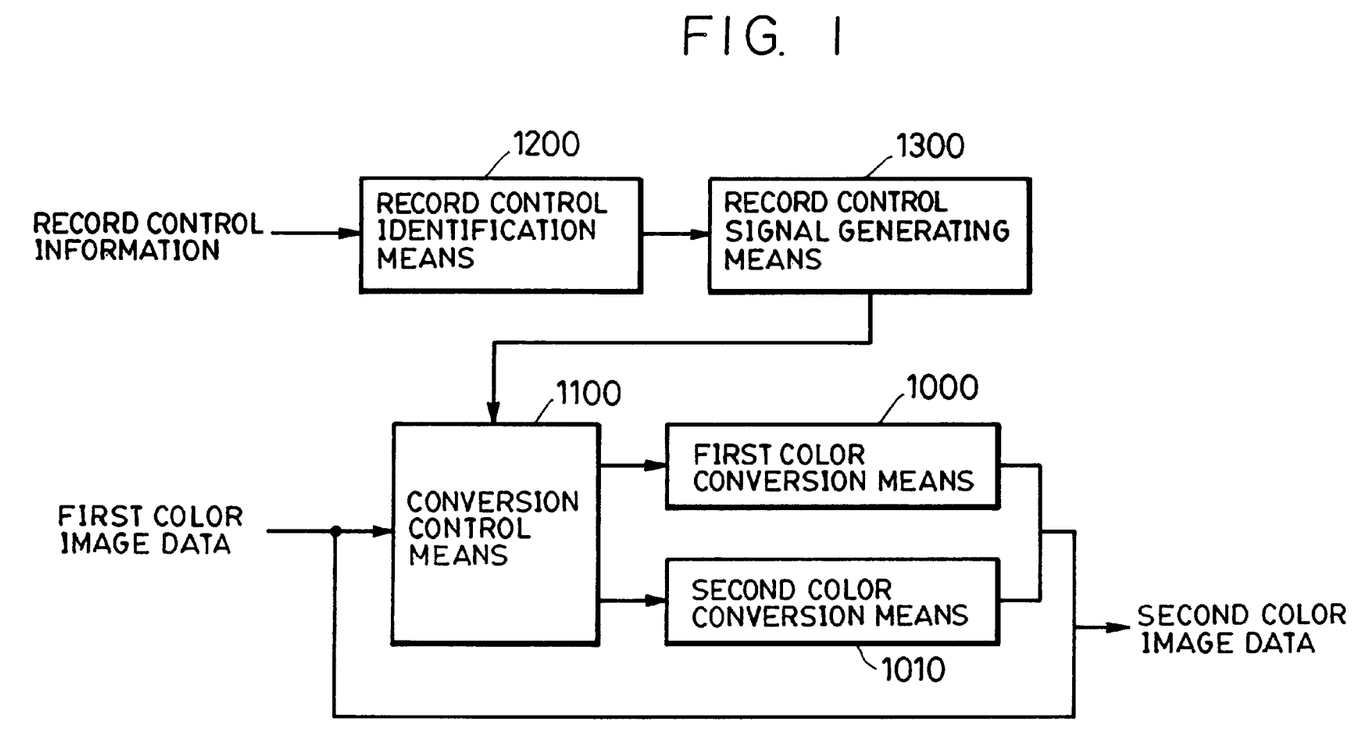
FIG. 1 is a block diagram showing the basic configuration of an embodiment of the present invention.

FIG. 1 is a drawing showing the basic configuration of the embodiment. In this embodiment, a color image recording apparatus is capable of producing an image pattern using the color image data received from an information generating source such as a host computer or the like and recording an image by two different recording means. As shown in FIG. 1, the color image recording apparatus comprises two color conversion means 1000 and 1010 which respectively correspond to the two recording means and convert first color information in the color image data into second color information, conversion control means 1100 which receives a control signal for directing the selection of one of the two recording means and which switches the transmission of the first color information so as to perform color conversion corresponding to the recording means indicated by the control signal, record control identification means 1200 which receives record control information and identifies the recording means shown by the information, and record control signal generating means 1300 which generates the control signal in correspondence with the results of the identification.

Figure 2:
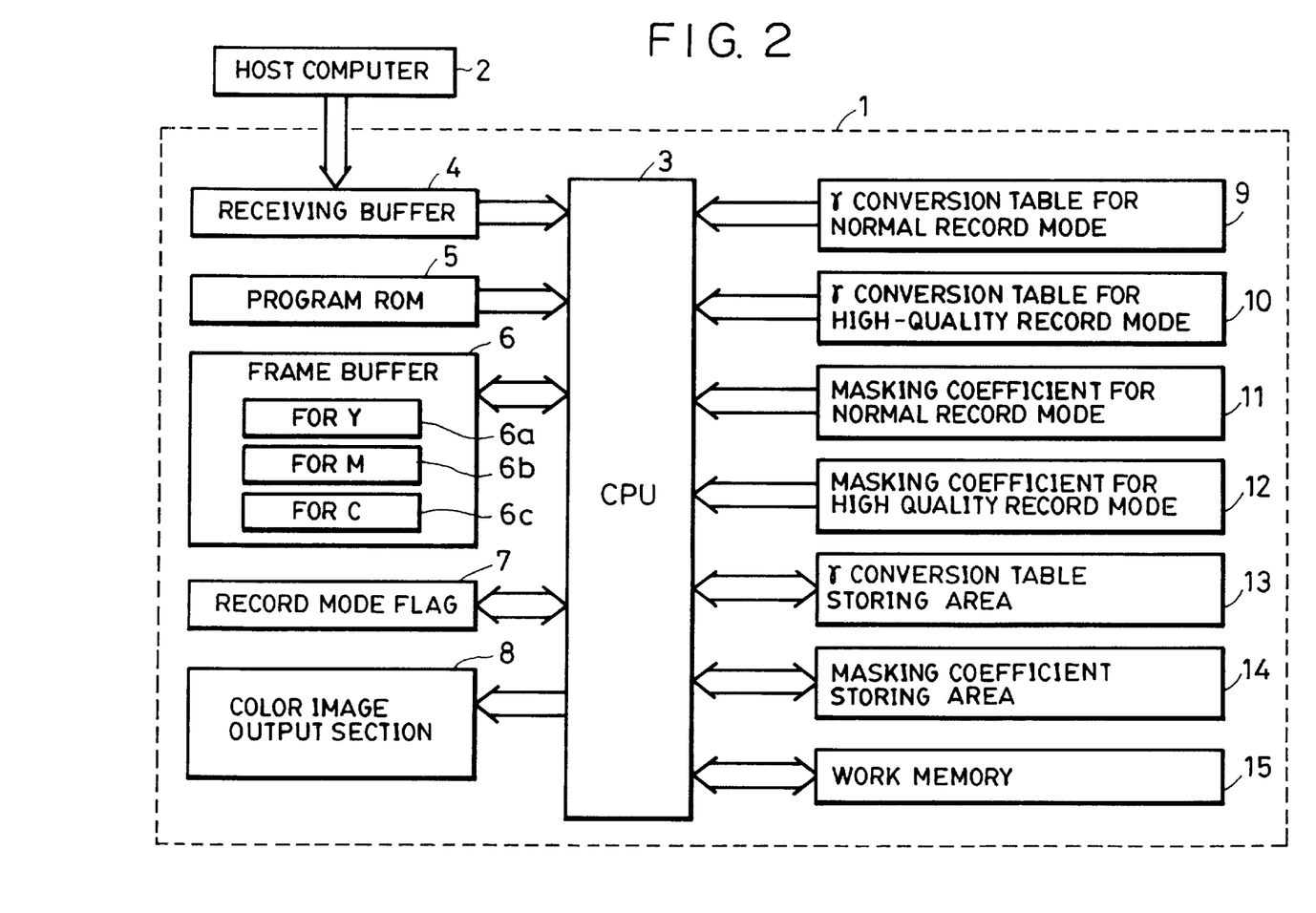
FIG. 2 is a block diagram showing the configuration of a typical circuit of the embodiment of the present invention.

FIG. 2 is a block diagram showing the configuration of the circuit of an image recording apparatus in accordance with an embodiment of the present invention.

In FIG. 2, reference numeral 1 denotes a color image recording apparatus which receives image data with color data expressed in red, green and blue components from a host computer 2 and which records an image using the three colors of yellow, magenta and cyan. Reference numeral 2 denotes the host computer for supplying color image data to the image recording apparatus of this embodiment.

Figure 3:
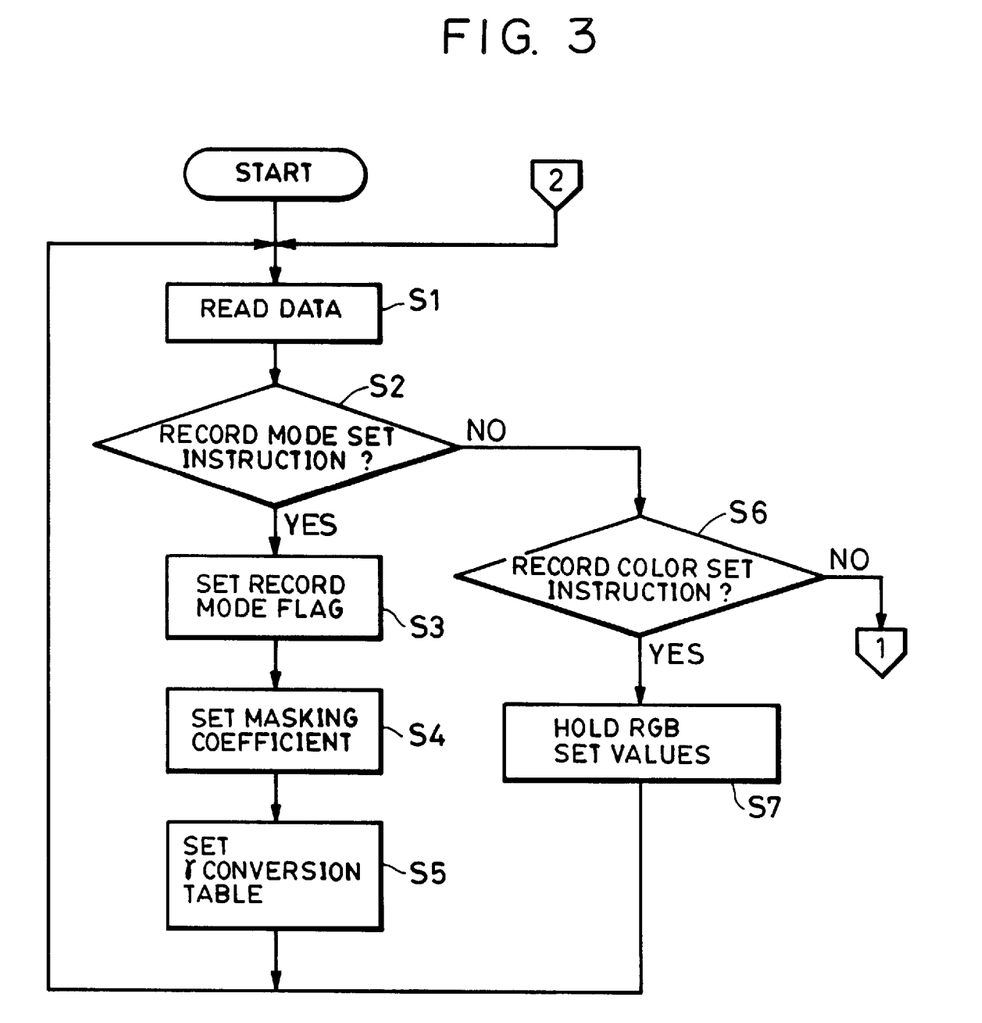
FIG. 3 is a flow chart showing the processing procedure executed by the CPU shown in FIG. 2.
Figure 4:
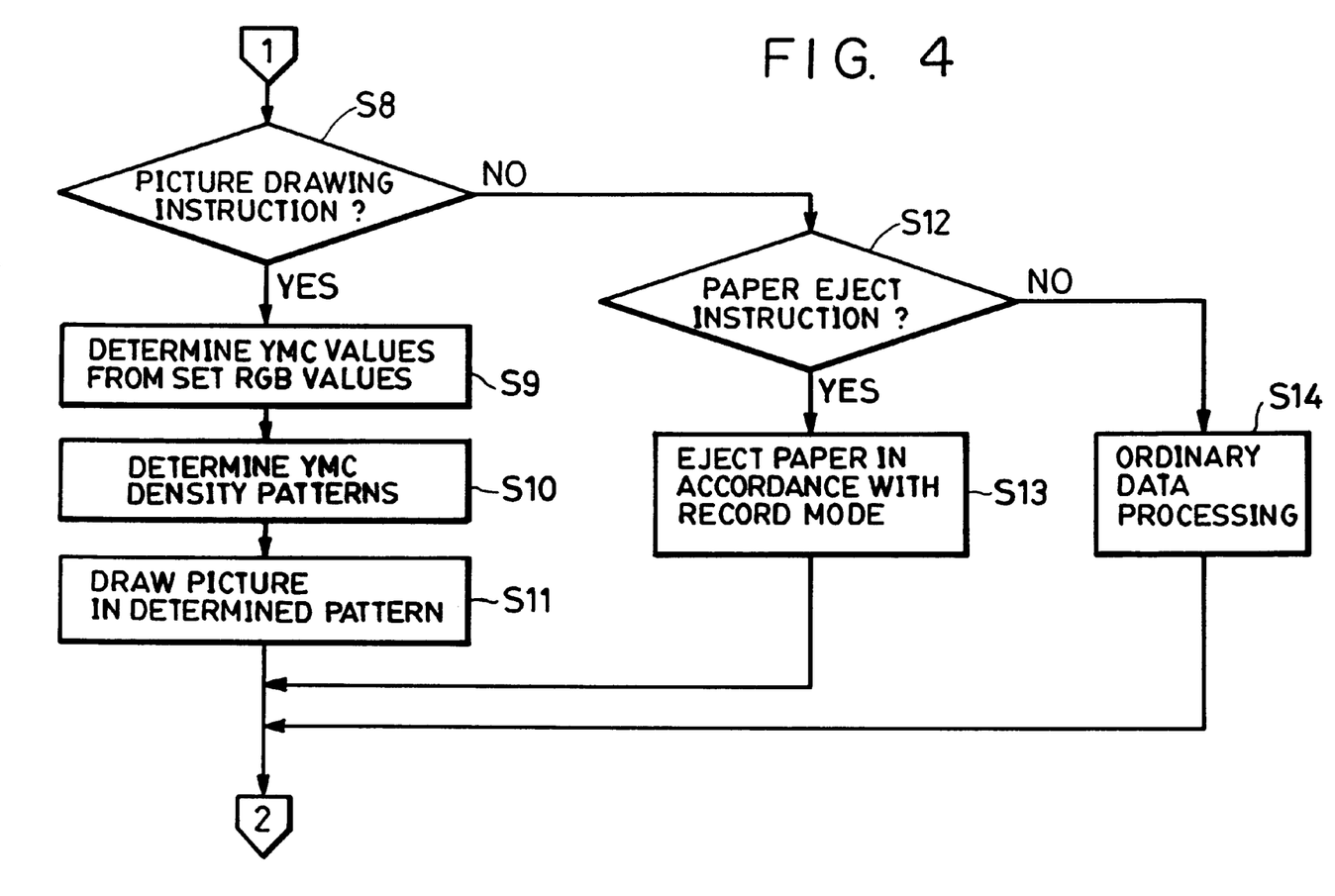
FIG. 4 is a flow chart showing the processing procedure executed by the CPU shown in FIG. 2.

Reference numeral 3 denotes a CPU for controlling the image recording apparatus according to a program corresponding to the flow chart shown in FIGS. 3 and 4 which is stored in a program ROM 5.

Reference numeral 4 denotes a receiving buffer for temporarily storing the color image data sent from the host computer. Reference numeral 5 denotes the program ROM for storing the program having the algorithm shown in FIGS. 3 and 4 and which causes the CPU 3 to control the body of the image recording apparatus.

Reference numeral 6 denotes a frame buffer for storing the image pattern formed for each of the colors Y, M, C.

Reference numeral 7 denotes a record mode flag for holding information identifying the recording means used by color image output section 8.

Reference numeral 8 denotes the color image output section which can switch between the two recording means and normal and high-quality record modes. In both modes, a color image is recorded by using the image pattern based on each of Y, M and C colors, and which is stored in the frame buffer 6.

Reference numeral 9 denotes data used for γ-conversion of the color conversion processing used in the normal record mode and which is shown by a table of the tone values of each of the Y, M and C colors in correspondence with density values from 0 to 255 (0 represents the density at which no ink is printed, and 255 represents the density at which ink is printed all over). In some cases the converted color information can comprise a coefficient of an equation used in the converting.

Reference numeral 10 denotes data used for γ-conversion similar to the data denoted by reference numeral 9, but which is used in a high-quality record mode.

Reference numeral 11 denotes an area for storing the masking coefficients used in masking processing of the color conversion processing used in the normal record mode.

Reference numeral 12 denotes the masking coefficients used in masking processing as the area denoted by reference numeral 11, but which is used in the high-quality record mode.

Reference numeral 13 denotes a γ-conversion table storing area for loading the data of the γ-conversion table 9 or 10 in accordance with the record mode.

Reference numeral 14 denotes a masking coefficient storing area for loading the values of the masking coefficients 11 or 12 in accordance with the record mode controlling the contents of area 13.

Reference numeral 15 denotes a work memory used for processing various items of data during the operation of the CPU 3.

[Description of Printer]

Figure 8:
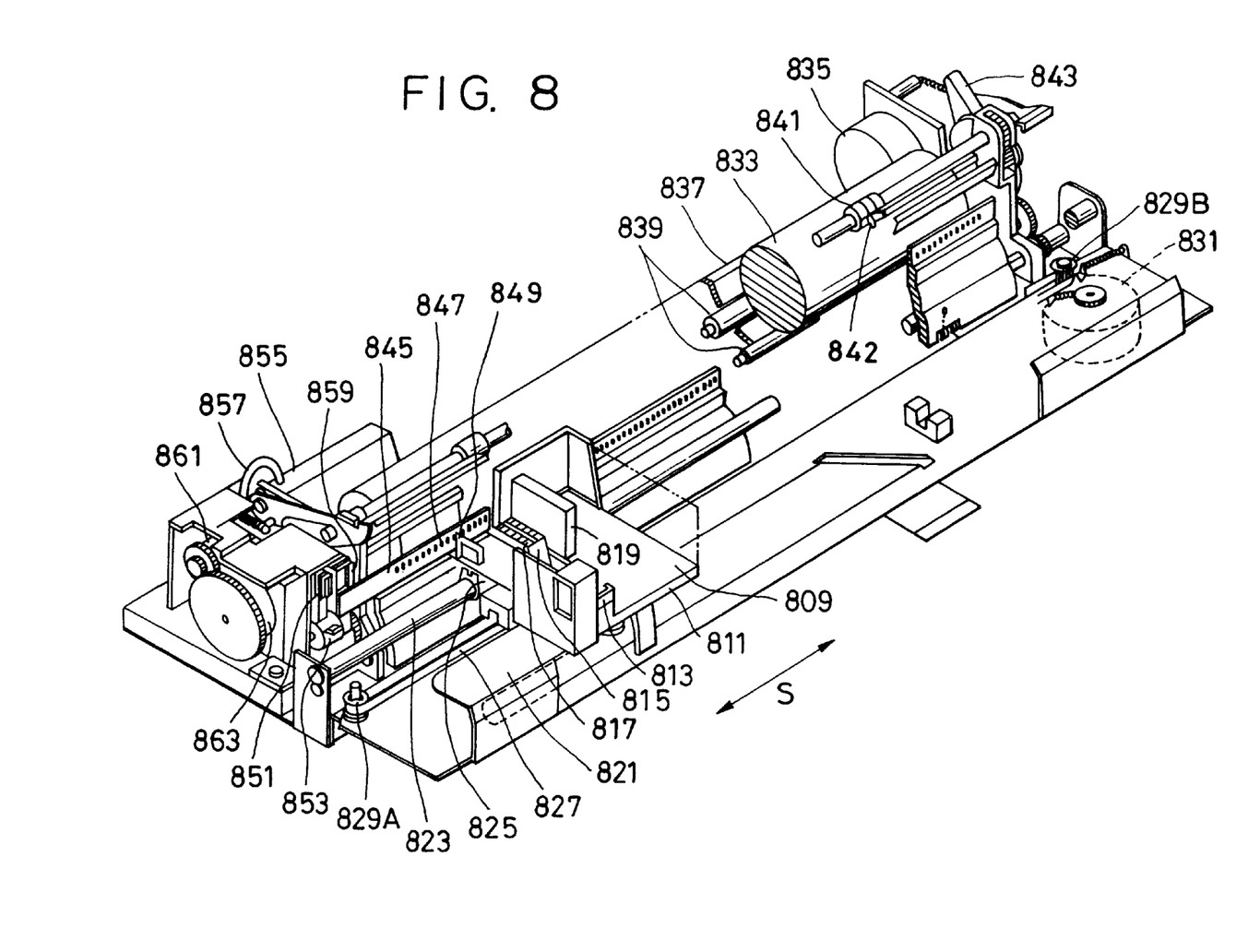
FIG. 8 is a drawing showing the configuration of a printer which can perform the present invention.

FIG. 8 shows an example of the configuration of a bubble jet printer in accordance with the present invention.

In FIG. 8, reference numeral 809 denotes a head cartridge having an ink jet recording head, and reference numeral 811 denotes a carriage for loading the head cartridge 809 thereon and scanning it in the direction shown by S in the drawing. Reference numeral 813 denotes a hook for attaching the head cartridge 809 to the carriage 811, and reference numeral 815 denotes a lever for operating the hook 813. The lever 815 is provided with a marker 817 for indicating a scale provided on the cover described below so as to make it possible to read the printing position of the recording head of the head cartridge 809, the set position and the like. Reference numeral 819 denotes a supporting plate for supporting an electrical connection portion of the head cartridge 809, and reference numeral 821 denotes a flexible cable for connecting the electrical connection portion to the control section of the body.

Reference numeral 823 denotes a guide shaft for guiding the carriage 811 along the direction S, which shaft is passed through a bearing 825 of the carriage 811. Reference numeral 827 denotes a timing belt to which the carriage 811 is fixed for transmitting power for moving the carriage 811 in the direction S and which is placed over the pulleys 829A and 829B disposed on the both sides of the apparatus. Driving force is transmitted to the pulley 829B from a carriage motor 831 through a transmitting mechanism such as a gear or the like.

Reference numeral 833 denotes a platen roller for restricting the recording surface of a recording medium (referred to as "recording paper) such as paper or the like and for conveying the recording paper during recording. The platen roller 833 is driven by a conveying motor 835. Reference numeral 837 denotes a paper guide for guiding the recording medium to a recording position from the side of a sheet feeding tray (not shown), and reference numeral 839 denotes a feed roller for pressing the recording medium placed in the course of feeding on the platen roller 833 so as to convey the recording medium. Reference numeral 841 denotes a paper ejection roller provided on the downstream side of the recording position in the direction of conveyance of the recording medium so as to eject the recording medium through paper ejection port (not shown). Reference numeral 842 denotes a spur provided corresponding to the paper ejection roller 841 which can press the roller 841 against the recording medium and generate the force for conveying the recording medium by the paper ejection roller 841. Reference numeral 843 denotes a release lever for releasing each of the feed rollers 839, a pressure plate 845 and the spur 842 from urging when the recording medium is set.

Reference numeral 845 denotes the pressure plate for controlling floating or the like of the recording medium at a position near the recording position so as to secure the state where the recording medium closely contacts with the platen roller 833. In this embodiment, an ink jet recording head which discharges ink for recording is used as the recording head. Since the distance between the recording surface of the recording medium and the surface of the recording head in which an ink discharge port is formed is relatively small, and the distance must be strictly controlled so as to prevent any contact between the recording medium and the surface of the recording head, it is beneficial to provide the pressure plate 845. Reference numeral 847 denotes the scale provided on the pressure plate 845, and reference numeral 849 denotes the marker provided on the carriage 811 corresponding to the scale. The scale 847 and the marker 849 make it possible to read the printing position of the recording head and the set position thereof.

Reference numeral 851 denotes a cap made of an elastic material such as rubber or the like and which is provided opposite to the surface of the recording head in which the ink discharge port is formed at the home position. The cap 851 is supported so that it can contact and separate from the recording head. The cap 851 is used for protecting the recording head during non-recording and discharge recovery processing of the recording head. In the discharge recovery process, the energy generating element provided in the ink discharge port and used for discharging ink is driven for discharging the ink from all discharge ports so as to remove obstructions that may cause a defective discharge such as bubbles, dust, ink which has thickened so as to be unsuitable for recording and the like (preliminary discharge), or forcing the ink to be discharged from the discharge ports so as to remove the possible obstructions.

Reference numeral 853 denotes a pump which generates suction force for forcing the ink to be discharged and used for sucking the ink received in the cap 851 during the discharge recovery processing by forced discharge or preliminary discharge. Reference numeral 855 denotes a waste ink tank for storing the waste ink cleared by the pump 853, and reference numeral 857 denotes a tube for causing the pump to communicate with the waste ink tank 855.

Reference numeral 859 denotes a blade for wiping the surface of the recording head having the discharge ports formed therein, which blade is supported so that it can be moved between a wiping position in the course of movement of the recording head where it is projected toward the side of the recording head and a retracted position where it does not engage with the surface of the recording head. Reference numeral 861 denotes a recovery system motor, and reference numeral 863 denotes a cam device which receives power from the recovery system motor 861 so as to drive the pump 853 and move the cap 851 and the blade 859.

[Description of Processing Operation]

The operation for image record processing in this embodiment configured as described above is described below with reference to the flow charts shown in FIGS. 3 and 4.

The flow charts shown in FIGS. 3 and 4 show the algorithm of the program stored in the program ROM 5 shown in FIG. 2.

In Step S1, the received data sent from the host computer 2 and stored in the receiving buffer 4 is read. Receipt of the data sent from the host computer 2 is performed by an interruption routine (not shown). In Step S2, a decision is made as to whether or not the read data is a record mode set instruction. If the data is the record mode set instruction, the flow moves to Step S3 for setting the value of a record mode flag. At this time, if the record mode set by the record mode set instruction is a normal record mode, the record mode flag is set to "1", and if the record mode is a high-quality record mode, the record mode flag is set to "2". The flow then moves to Steps S4 and S5 for loading the masking coefficients (9 and 11 or 10 and 12) and the γ-conversion table corresponding to the record mode shown by the record mode flag on the γ-conversion masking coefficient holding area 14 and the table holding area 13, respectively. The flow then returns to Step S1, and subsequent data processing is repeated.

On the other hand, if it is decided in Step S2 that the read data is not the record mode set instruction, the flow moves to Step S6 where a decision is made as to whether or not the data read from the host computer 2 is a record color set instruction. If the data is the record color set instruction, the flow advances to Step S7 where the RGB set value is held in the work memory 15. The flow then returns to Step S1, and the subsequent data processing is repeated.

If it is decided in Step S6 that the read data is not the record color set instruction, the flow moves to Step S8. In Step S8, a decision is made as to whether or not the data read from the host computer 2 is a picture drawing instruction. The picture drawing instruction is an instruction to draw a character or figure. If it is decided that the read data is the picture drawing instruction, the flow moves to Step S9. In Step S9, the set values of record color RGB are read from the work memory 15 and are converted into the gradation values of Y, M and C according to the flow shown in FIG. 5. The flow then moves to Step S10 in which the gradation pattern corresponding to each of the gradation values of Y, M and C is determined. In Step S11, a character or figure is drawn for each of the colors Y, M and C using the gradation patterns and is stored in the frame buffer 6. The flow then returns to Step S1, and the subsequent data processing is repeated.

If it is decided in Step S8 that the read data is not the picture drawing instruction, the flow moves to Step S12. In Step S12, a decision is made as to whether or not the data read from the host computer 2 is a paper eject instruction. If it is decided that the data is the paper eject instruction, the flow moves to Step S13 for recording and ejecting the recording paper. In the recording and the paper eject processing, the normal record mode or the high-quality record mode is selected on the basis of the set value of the record mode flag 7, and recording is performed in the mode selected.

If it is decided in Step S12 that the read data is not the paper eject instruction, the flow moves to Step S14. The data processed in Step S14 include an instruction to select the type of the character (style and size), a position indicating instruction to indicate the drawing position and the like. All instructions are respectively processed in Step S14.

As described above, this embodiment permits different types of color conversion processing to be respectively made for two different recording means. More than two different recording means can also be used.

Although, in the embodiment, the color components in the color image data supplied from the host computer are described as RGB colors, the present invention is not limited to these colors, and other color specification systems of L*a*b* of GIE, XYZ and the like may be used without producing problems.

In addition, although, in the above embodiment, the record control data serving as a base for generating the record control signal required for selecting the recording means is received from the record mode set instruction in the color image data, the mode can be specified by key operation using a console panel (not shown). In this case, the CPU 3 reads the value set by the console panel to set the record mode flag 7.

Figure 5:
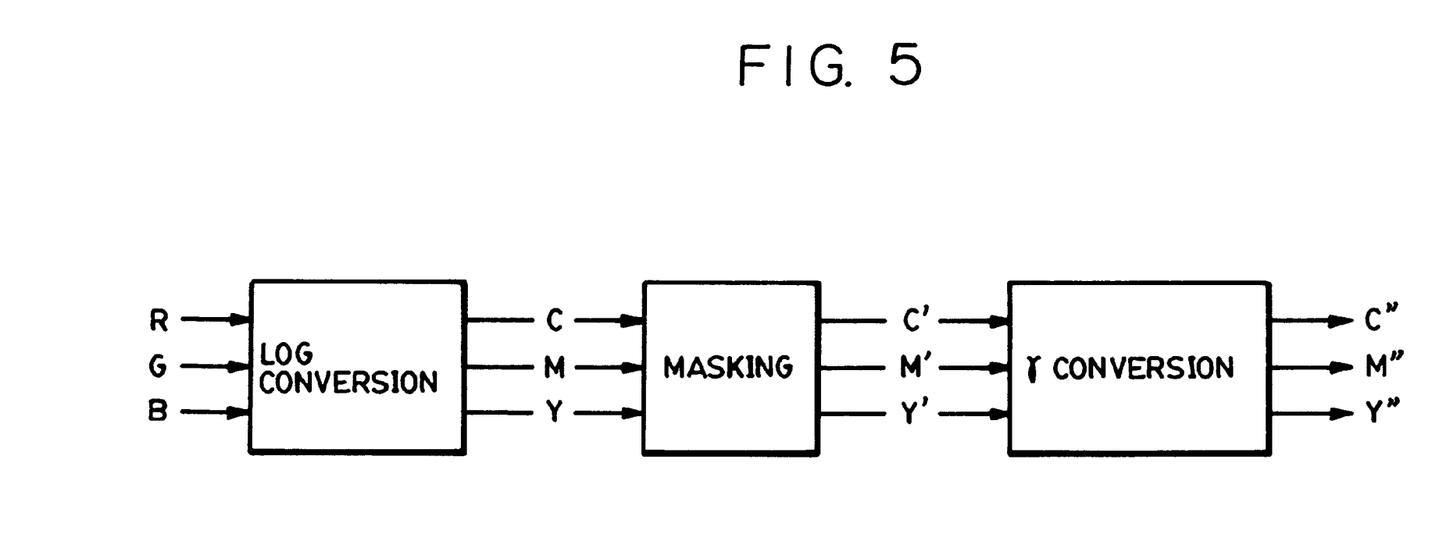
FIG. 5 is an explanatory view showing the color conversion processing flow of the invention.

Further, although, in the embodiment, both the color conversion processes respectively corresponding to the two recording means have the flow shown in FIG. 5 with a difference in the parameter values, other color conversion processes having completely different flows may be used.

The present invention can be applied to not only a system comprising a plurality of apparatuses but also an apparatus comprising a single device. The invention can be of course applied to the case where a program is supplied to a system or an apparatus.

What is claimed is:

1. A color image recording method comprising the steps of:

providing a recording apparatus for recording an image line on a recording medium with one of a plurality of different recording methods, the recording apparatus using a recording head that moves in a pass along a main scan direction, and conveying means for conveying the recording medium in a sub-scan direction, the image line having a width in the sub-scan direction;

inputting a color image information for a color image to be recorded;

indicating an indicated recording method from among said plurality of different recording methods for recording said color image information, said plurality of different recording methods including an interlaced recording method of printing having a first recording conversion scheme associated therewith in which in a given pass of the recording head on previously non-printed pixels which are included in an area interlaced with a part of a preceding pass of the recording head, and which are surrounded by previously-printed pixels recorded in the preceding pass of the recording head, the conveying means conveys the recording medium by a distance which is less than the width of the image line after each pass, and an other recording method of printing having a second recording conversion scheme associated therewith that is different from the first recording conversion scheme;

converting said color image information in accordance with the indicated recording method using the associated one of the first recording conversion scheme and the second recording conversion scheme; and outputting the converted color image information for recording the image.

2. A color image recording method according to claim 1, wherein said indicating step further comprises indicating plural recording methods from among said plurality of different recording methods for recording said color image information, and said color image recording method further comprises the step of storing said converted color information in correspondence with said plural recording methods which have been indicated.

3. A color image recording method according to claim 2, wherein said converted color information comprises at least one coefficient of an equation used for said color converting step.

4. A color image recording method according to claim 1, wherein each of said plurality of different recording methods has different orders of recording of said image information to be output.

5. A color image recording method according to claim 1, further comprising the step of controlling a printer engine so as to print an image in accordance with said outputted image information.

6. A method according to claim 1, wherein said color image recording method is executed in a printer.

7. A method according to claim 1, wherein the color image information is input from a host computer.

8. A color image recording method comprising the steps of:

providing a recording apparatus for recording an image line on a recording medium with a one of a plurality of different recording methods, the recording apparatus using a recording head that moves in a pass along a main scan direction, and conveying means for conveying the recording medium in a sub-scan direction, the image line having a width in the sub-scan direction;

converting a first color information in the input image information into a second color information for recording based on said input image information;

recording said converted information;

providing said plurality of different recording methods such that either in a first non-interlaced recording method having a first recording conversion scheme associated therewith said image is recorded by a recording head which, during scanning, does not interlace with a previously-scanned area, or in a second interlaced recording method having a second recording conversion scheme associated therewith that is different from said first recording conversion scheme said image is recorded by recording in a given pass of the recording head on non-printed pixels which are included in an area interlaced with a part of a preceding pass of the recording head, and which are surrounded by previously-printed pixels recorded in the preceding pass of the recording head, the conveying means conveying the recording medium in the second interlaced recording method of printing by a distance which is less than the width of the image line after each pass;

providing a plurality of methods of converting said first color information in correspondence with said plurality of different recording methods using the associated one of the first recording conversion scheme and the second recording conversion scheme; and selecting one of said plurality of different recording methods.

9. A color image recording method according to claim 8, further comprising the step of controlling a printer engine so as to print using said selected recording method.

10. A color image recording apparatus for recording on a recording medium using a one of a plurality of different recording methods, the recording apparatus using a recording head for recording an image line on the recording medium, comprising:

scanning means for moving the recording head in a pass along a main scan direction;

conveying means for conveying the recording medium in a sub-scan direction, the image line having a width in the sub-scan direction;

color information input means for inputting a color information for a color image to be recorded;

record method indicating means for indicating an indicated recording method from among said plurality of different recording methods for recording said color image information, said plurality of different recording methods including an interlaced recording method of printing having a first recording conversion scheme associated therewith in which in a given pass of the recording head on previously non-printed pixels which are included in an area interlaced with a part of a preceding pass of the recording head, and which are surrounded by previously-printed pixels recorded in the preceding pass of the recording head, the conveying means conveys the recording medium by a distance which is less than the width of the image line after each pass, and an other recording method of printing having a second recording conversion scheme associated therewith that is different from the first recording conversion scheme;

color conversion means for converting said color information in accordance with the indicated recording method using the associated one of the first recording conversion scheme and the second recording conversion scheme; and image output means for outputting said converted color image information for recording the image.

11. An apparatus according to claim 10, wherein said record method indicating means are further for indicating plural recording methods from among said plurality of different recording methods for recording said color image information, and said apparatus further comprises storing means for storing said converted color information in correspondence with said plural recording methods which have been indicated.

12. An apparatus according to claim 7, wherein said converted color information includes at least one coefficient of an equation used for color conversion.

13. An apparatus according to claim 10, wherein each of said plurality of different recording methods has different orders of recording said image information to be output.

14. A color image recording apparatus according to claim 10 further comprising a printer engine which prints an image in accordance with the image information outputted from said image output means.

15. A color image recording apparatus for recording on a recording medium, in which a first color information in color image data is converted into a second color information for recording an image based on said color image data to form a plurality of image patterns which are respectively recorded by a one of a plurality of different recording methods such that either in a first non-interlaced recording method having a first recording conversion scheme associated therewith said image is recorded by a recording head for recording an image line on the recording medium, the recording head being moved by a scanning means for scanning which scans the recording head in a pass along a main scan direction, and which, during scanning, does not interlace with a previously-scanned area, or in a second interlaced recording method having a second recording conversion scheme associated therewith that is different from said first recording conversion scheme said image is recorded by recording in a given pass of the recording head on non-printed pixels which are included in an area interlaced with a part of a preceding pass of the recording head, and are surrounded by previously-printed pixels recorded in the preceding pass of the recording head, the conveying means conveying the recording medium in the second interlaced recording method by a distance which is less than a half of the width of the image line after each pass, said apparatus comprising:

a plurality of color conversion means for converting said first color information in said color image data into said second color information in accordance with said plurality of different recording methods using the associated one of the first recording conversion scheme and the second recording conversion scheme; and conversion control means for converting, said conversion control means receiving a control signal for selecting said one of said plurality of different recording methods so as to control one of said plurality of color conversion means in accordance with said control signal.

16. A color image recording apparatus according to claim 15 further comprising a printer engine which prints an image in accordance with the color information converted by said plurality of color conversion means.

17. A printing method comprising the steps of:

providing a recording apparatus for recording an image line on a recording medium using a one of a plurality of different recording methods, the recording apparatus using a recording head that moves in a pass along a main scan direction, and conveying means for conveying the recording medium in a sub-scan direction, the image line having a width in the sub-scan direction;

receiving a color image information to be output and a control signal which indicates said one of said plurality of different recording methods which is to be performed, said one recording method being such that either in a first non-interlaced recording method having a first recording conversion scheme associated therewith said image is recorded by a recording head scanning so as not to interlace with a previously-scanned area or in a second interlaced recording method having a second recording conversion scheme associated therewith that is different from said first recording conversion scheme said image is recorded by recording in a given pass of the recording head on non-printed pixels which are included in an area interlaced with a part of a preceding pass of the recording head, and which are surrounded by previously-printed pixels recorded in the preceding pass of the recording head, the conveying means conveying the recording medium by a distance which is less than the width of the image line after each pass;

converting said color image information to be output according to said received control signal using the associated one of the first recording conversion scheme and the second recording conversion scheme; and printing a color document according to said converted color information by the method selected in accordance with said control signal.

18. A printing method according to claim 17, wherein said receiving step further receives plural control signals indicating plural methods from among the plurality of different recording methods, and said printing method further comprises a step of storing said converted color image information in correspondence with said plural recording methods which have been indicated.

19. A printing method according to claim 18, wherein said converted color information comprises at least one coefficient of an equation used in said color converting step.

20. A printing apparatus for recording on a recording medium, the printing apparatus using a recording head for recording an image line on the recording medium using a one of a plurality of different recording methods, comprising:

scanning means for moving the recording head in a pass along a main scan direction;

conveying means for conveying the recording medium in a sub-scan direction, the image line having a width in the sub-scan direction;

receiving means for receiving a color image information to be output and a control signal which indicates said one of said plurality of different recording methods which is to be performed, said one recording method being such that either in a first non-interlaced recording method having a first recording conversion scheme associated therewith said image is recorded by a recording head scanning so as not to interlace with a previously-scanned area or in a second interlaced recording method having a second recording conversion scheme associated therewith that is different from said first recording conversion scheme said image is recorded by recording in a given pass of the recording head on non-printed pixels which are included in an area interlaced with a part of a preceding pass of the recording head, and which are surrounded by previously-printed pixels recorded in the preceding pass of the recording head, the conveying means conveying the recording medium by a distance which is less than the width of the image line after each pass;

converting means for converting said color image information to be output according to said received control signal using the associated one of the first recording conversion scheme and the second recording conversion scheme; and printing means for printing a color document according to said converted color information by the method selected in accordance with said control signal.

21. A printing apparatus according to claim 20, wherein said receiving means are further for receiving plural control signals indicating plural methods from among the plurality of different recording methods, and said printing apparatus further comprises storing means for storing said converted color image information in correspondence with said plural recording methods which have been indicated.

22. A printing apparatus according to claim 21, wherein said converted color information comprises at least one coefficient of an equation used in said color converting step.

23. A computer-readable storage medium which stores computer-executable process steps to cause a computer to control recording of a color image by a recording apparatus according to one of a plurality of color image recording methods, the recording apparatus for recording an image line on a recording medium, the recording apparatus using a recording head that moves in a pass along a main scan direction and using conveying means for conveying the recording medium in a sub-scan direction, the image line having a width in the sub-scan direction, the computer-executable process steps comprising the steps of (a) inputting color image information for the color image to be recorded; (b) indicating an indicated recording method from among said plurality of different recording methods for recording said color image information, said plurality of different recording methods including an interlaced recording method of printing having a first recording conversion scheme associated therewith in which in a given pass of the recording head on previously non-printed pixels which are included in an area interlaced with a part of a preceding pass of the recording head, and which are surrounded by previously-printed pixels recorded in the preceding pass of the recording head, the conveying means conveys the recording medium by a distance which is less than the width of the image line after each pass, and an other recording method of printing having a second recording conversion scheme associated therewith that is different from the first recording conversion scheme; (c) converting said color image information in accordance with the indicated recording method using the associated one of the first recording conversion scheme and the second recording conversion scheme; and (d) outputting the converted color image information for recording the image.

24. A computer-readable storage medium which stores computer-executable process steps to cause a computer to control recording of an input image by a recording apparatus according to one of a plurality of color image recording methods, the recording apparatus for recording an image line on a recording medium, the recording apparatus using a recording head that moves in a pass along a main scan direction and using conveying means for conveying the recording medium in a sub-scan direction, the image line having a width in the sub-scan direction, the computer-executable process steps comprising the steps of (a) converting first color information in the input image information into second color information for recording based on said input image information; (b) recording said converted information; (c) providing said plurality of different recording methods such that either in a first non-interlaced recording method having a first recording conversion scheme associated therewith said image is recorded by a recording head which, during scanning, does not interlace with a previously-scanned area, or in a second interlaced recording method having a second recording conversion scheme associated therewith that is different from said first recording conversion scheme said image is recorded by recording in a given pass of the recording head on non-printed pixels which are included in an area interlaced with a part of a preceding pass of the recording head, and which are surrounded by previously-printed pixels recorded in the preceding pass of the recording head, the conveying means conveying the recording medium in the second interlaced recording method of printing by a distance which is less than the width of the image line after each pass; (d) providing a plurality of methods of converting said first color information in correspondence with said plurality of different recording methods using the associated one of the first recording conversion scheme and the second recording conversion scheme; and (e) selecting one of said plurality of different recording methods.

25. A computer-readable storage medium which stores computer-executable process steps, the computer-executable process steps to cause a computer to control recording of a color image by a recording apparatus according to one of a plurality of color image recording methods, the recording apparatus for recording an image line on a recording medium, the recording apparatus using a recording head that moves in a pass along a main scan direction and using conveying means for conveying the recording medium in a sub-scan direction, the image line having a width in the sub-scan direction, the computer-executable process steps comprising the steps of (a) receiving color image information to be output and a control signal which indicates said one of said plurality of different recording methods which is to be performed, said one recording method being such that either in a first non-interlaced recording method having a first recording conversion scheme associated therewith said image is recorded by a recording head scanning so as not to interlace with a previously-scanned area or in a second interlaced recording method having a second recording conversion scheme associated therewith that is different from said first recording conversion scheme said image is recorded by recording in a given pass of the recording head on non-printed pixels which are included in an area interlaced with a part of a preceding pass of the recording head, and which are surrounded by previously-printed pixels recorded in the preceding pass of the recording head, the conveying means conveying the recording medium by a distance which is less than the width of the image line after each pass; (b) converting said color image information to be output according to said received control signal using the associated one of the first recording conversion scheme and the second recording conversion scheme; and (c) printing a color document according to said converted color information by the method selected in accordance with said control signal.

* * * * *

UNITED STATES PATENT AND TRADEMARK OFFICE
CERTIFICATE OF CORRECTION

PATENT NO. : 6,024,437

DATED : February 15, 2000

INVENTOR : FUMIHIRO TANAKA

It is certified that error appears in the above-identified patent and that said Letters Patent is hereby corrected as shown below:

<u>COLUMN 3</u>

Line 14, "out" should read --our--.

<u>COLUMN 8</u>

Line 22, "an other" should read --another--.

<u>COLUMN 9</u>

Line 57, "an other" should read --another--.

<u>COLUMN 10</u>

Line 8, "claim 7," should read --claim 11,--; and
Line 15, "10" should read --10,--.

Signed and Sealed this

Twenty-seventh Day of February, 2001

Attest:

NICHOLAS P. GODICI

Attesting Officer      Acting Director of the United States Patent and Trademark Office